United States Patent
Disch et al.

(10) Patent No.: US 10,292,563 B2
(45) Date of Patent: May 21, 2019

(54) WAREWASHER AND METHOD FOR OPERATING A WAREWASHER

(71) Applicants: Harald Disch, Elzach (DE); Dietrich Berner, Waldstetten (DE); Klaus Padtberg, Korbach (DE); Harry Braun, Durbach (DE)

(72) Inventors: Harald Disch, Elzach (DE); Dietrich Berner, Waldstetten (DE); Klaus Padtberg, Korbach (DE); Harry Braun, Durbach (DE)

(73) Assignee: PREMARK FEG L.L.C., Glenview, IL (US)

( * ) Notice: Subject to any disclaimer, the term of this patent is extended or adjusted under 35 U.S.C. 154(b) by 230 days.

(21) Appl. No.: 14/414,155

(22) PCT Filed: Jul. 16, 2013

(86) PCT No.: PCT/US2013/050592
§ 371 (c)(1),
(2) Date: Jan. 12, 2015

(87) PCT Pub. No.: WO2014/014858
PCT Pub. Date: Jan. 23, 2014

(65) Prior Publication Data
US 2015/0173585 A1    Jun. 25, 2015

(30) Foreign Application Priority Data
Jul. 18, 2012   (DE) .................. 10 2012 212 638

(51) Int. Cl.
*A47L 15/42*    (2006.01)
*A47L 15/00*    (2006.01)
(Continued)

(52) U.S. Cl.
CPC ....... *A47L 15/0076* (2013.01); *A47L 15/0044* (2013.01); *A47L 15/4229* (2013.01);
(Continued)

(58) Field of Classification Search
CPC ............. A47L 15/4229; A47L 15/4231; A47L 2401/03; A47L 2401/11; A47L 2501/18; A47L 2501/34
See application file for complete search history.

(56) References Cited

U.S. PATENT DOCUMENTS 6,463,940 B1    10/2002   Thomas
6,766,812 B1*    7/2004   Gadini ................ A47L 15/4229
                                                                   134/109
(Continued)

FOREIGN PATENT DOCUMENTS

DE        4142665       7/1993
DE      690 12 045      1/1995
(Continued)

OTHER PUBLICATIONS

DE10011692—Machine Translation, Sep. 2001.*
(Continued)

*Primary Examiner* — Marc Lorenzi
(74) *Attorney, Agent, or Firm* — Thompson Hine LLP

(57) ABSTRACT

A warewasher has at least one treatment system comprising a jet system (60, 61, 62, 63, 202) with at least one jet for spraying treatment liquid onto the items within at least one treatment zone (32, 33, 201), a fresh water system and a control device (10), wherein the fresh water system has at least one water feed (71), with at least one fresh water inlet (70) for the introduction of fresh water into the at least one treatment zone (32, 33, 201) as well as a controllable capacitive deionization unit (50), wherein the at least one cell (50*a*, 50*b*) is designed to be operated in a deionization
(Continued)

mode and in at least one further operating mode, wherein the control device (10) is designed to change the operating mode of the at least one cell (50a, 50b) in accordance with at least one operating parameter of the warewasher.

11 Claims, 4 Drawing Sheets

(51) Int. Cl.
    *C02F 1/469* (2006.01)
    *D06F 39/00* (2006.01)

(52) U.S. Cl.
    CPC ........ *A47L 15/4231* (2013.01); *C02F 1/4691* (2013.01); *A47L 2401/03* (2013.01); *A47L 2401/04* (2013.01); *A47L 2401/09* (2013.01); *A47L 2401/11* (2013.01); *A47L 2501/18* (2013.01); *A47L 2501/34* (2013.01); *C02F 2209/005* (2013.01); *C02F 2209/05* (2013.01); *C02F 2303/16* (2013.01); *C02F 2307/12* (2013.01); *D06F 39/007* (2013.01)

(56) References Cited

U.S. PATENT DOCUMENTS

| | | | | |
|---|---|---|---|---|
| 6,823,878 | B1* | 11/2004 | Gadini | ................ A47L 15/4229 |
| | | | | 134/109 |
| 7,083,733 | B2* | 8/2006 | Freydina | ................ B01D 61/46 |
| | | | | 210/739 |
| 2005/0017114 | A1* | 1/2005 | Gadini | ................ A47L 15/4229 |
| | | | | 242/375.1 |
| 2005/0252532 | A1 | 11/2005 | Gray et al. | |
| 2005/0252538 | A1 | 11/2005 | Vernon et al. | |
| 2005/0263457 | A1 | 12/2005 | Wilkins | |
| 2009/0114598 | A1* | 5/2009 | van Kralingen | .... A47L 15/4229 |
| | | | | 210/676 |
| 2011/0017240 | A1* | 1/2011 | Berner | ................ A47L 15/0047 |
| | | | | 134/25.2 |
| 2012/0298153 | A1* | 11/2012 | Seed | ................... A47L 15/4229 |
| | | | | 134/109 |

FOREIGN PATENT DOCUMENTS

| | | | | |
|---|---|---|---|---|
| DE | 10011692 | | 9/2001 | |
| DE | 103 52 120 | | 6/2005 | |
| DE | 102005005040 | * | 8/2006 | ......... A47L 15/4229 |
| EP | 1 080 681 | | 3/2001 | |
| EP | 1 204 364 | | 5/2002 | |
| EP | 1 582 135 | | 3/2005 | |
| EP | 2 874 530 | | 7/2013 | |
| WO | 00/64325 | | 11/2000 | |
| WO | 2005/087669 | | 9/2005 | |
| WO | 2006/079417 | | 8/2006 | |
| WO | 2011/094852 | | 8/2011 | |

OTHER PUBLICATIONS

DE102005005040—Machine Translation, Aug. 2006.*
PCT, International Search Report and Written Opinion, PCT/US2013/050592, dated May 23, 2014.
Opposition Against EP2874530 filed by Sanhua A Weco, (Machine translation by Google translate included), 23 pages.
Opposition Against EP2874530 filed by Ecolab, 42 pages.

* cited by examiner

|  | Pre-washing | Washing | Draining | Rinsing | Standby |
|---|---|---|---|---|---|
| Deionization | X | X |  |  |  |
| Regeneration |  |  | X |  |  |
| Flushing |  |  |  | X |  |

|  | Pre-washing | Washing | Draining | Rinsing | Standby |
|---|---|---|---|---|---|
| Deionization | X |  |  |  | X |
| Regeneration |  | X |  |  |  |
| Flushing |  |  | X |  |  |

|  | Pre-washing | Washing | Draining | Rinsing | Standby |
|---|---|---|---|---|---|
| Deionization |  | X | X |  |  |
| Regeneration |  |  |  | X |  |
| Flushing | X |  |  |  |  |

WAREWASHER AND METHOD FOR OPERATING A WAREWASHER

BACKGROUND OF THE INVENTION

The invention relates to a commercial warewasher for crockery or utensils, which is provided as a box-type warewasher or as a conveyor warewasher, and also relates to a method for operating such a warewasher.

The invention accordingly relates to a warewasher having at least one treatment system comprising a jet system with at least one jet for spraying treatment liquid onto the items to be cleaned within at least one treatment zone.

Warewashers for crockery or utensils according to the invention of this type are either provided as box-type warewashers or as conveyor warewashers.

In particular, conveyor warewashers are flight-type warewashers or rack conveyor warewashers and, in contrast to box-type warewashers, in which the items to be cleaned remain stationary in a single treatment zone of the box-type warewasher during the cleaning process, in the case of conveyor warewashers the items to be washed are transported through various treatment zones of the conveyor warewasher.

A conveyor warewasher normally has at least one pre-washing zone and at least one main washing zone, which is arranged after the pre-washing zone or the pre-washing zones as viewed in the direction of transport of the items to be washed. As viewed in the direction of transport, at least one post-washing zone is generally arranged after the main washing zone or the main washing zones, and at least one final rinse zone is generally arranged downstream of the post-washing zone. As viewed in the direction of transport, once passed through an entry tunnel, the items to be washed either received directly on the conveyor belt or held by racks therefore normally pass through one or more pre-washing zones, one or more main washing zones, one or more post-washing zones and also one or more final rinse zones, a drying zone and also an exit route.

Each of the aforementioned washing zones of the conveyor warewasher is assigned a respective treatment system, which comprises a washing pump and a line system connected to the washing pump, via which washing liquid is fed to the jet system or to the jets of the jet system. The washing liquid or treatment liquid fed to the at least one washing jet of the jet system is sprayed into the respective washing zones of the conveyor warewashers and onto the items to be washed, which are transported through the respective washing zones by a transport apparatus of the conveyor warewasher. Each washing zone is assigned a tank, in which the liquid sprayed by the washing jet is received and/or in which liquid is held ready for the jet system of the respective treatment zones.

In the conveyor warewashers known conventionally from the prior art, final rinse liquid in the form of fresh water is sprayed via the rinsing jets in the final rinse zone onto the items to be washed. At least some of the sprayed final rinse liquid is transported from zone to zone via a cascade system, against the direction of transport of the items to be washed.

The sprayed final rinse liquid is collected in a tank in the post-washing zone, from which it is conveyed via the washing pump of the washing system belonging to the post-washing zone to the rinsing jets of the post-washing zone. Washing liquid is rinsed off from the items in the post-washing zone. The liquid accumulating during this process flows into the washing tank of the at least one main washing zone, which is arranged upstream of the post-washing zone as viewed in the direction of transport of the items to be washed. Here, the liquid is normally provided with a cleaning agent and is sprayed via the jets in the main washing zone onto the items to be washed by means of a pump system belonging to the washing system of the main washing zone. The liquid then flows from the washing tank in the main washing zone into the pre-washing tank in the pre-washing zone. The liquid in the pre-washing tank is sprayed by means of the pre-washing jets in the pre-washing zone onto the items to be washed via a pump system belonging to the washing system in the pre-washing zone in order to remove larger soiling particles from the items to be washed.

Box-type warewashers are warewashers that can be manually loaded and unloaded. These include crockery rack pass-through warewashers, which are also referred to as hood-type warewashers, or front loader warewashers. Front loader warewashers may be undercounter machines, top-counter machines or free-standing front loaders.

A warewasher provided as a box-type warewasher normally has a treatment zone (treatment chamber) for cleaning items to be washed. A washing system provided as a recirculation circuit is generally arranged in this treatment zone. A washing tank, into which liquid from the treatment zone can flow back as a result of gravity, is normally arranged beneath the treatment chamber. Washing liquid, which is normally water, to which cleaning agent can be added as necessary, is located in the washing tank.

The washing liquid located in the washing tank can be conveyed from a washing pump via a line system to the at least one washing jet and, by means of said at least one washing jet, can be sprayed in the treatment chamber onto the items to be cleaned.

In warewashers provided as box-type warewashers, fresh water can be introduced via a fresh water inlet into the treatment chamber, generally into the jet system and line system of the treatment chamber. This is necessary for example at the start of the cleaning program in order to provide a required recirculation quantity of water. After a cleaning program phase of the warewasher provided as a box-type warewasher, introduced fresh water can also be used however as final rinse liquid.

Before new fresh water is fed for final rinsing, the same quantity of washing liquid is generally drained from the washing tank into the on-site wastewater network.

It is already known that the quality of the introduced water is a key prerequisite for an acceptable washing result. Since the water to be introduced is normally removed from the local mains drinking water supply, generally not all requirements of a water quality adequate in terms of washing are met. When assessing the water quality, the overall hardness of the water to be introduced, the chloride content, heavy-metal concentrations and also the total salt content are to be included.

Customary guidelines in the industry for the maximum chloride content in order to avoid pitting in the case of low alloyed cutlery items are 50 mg/l of water for example.

In the case of heavy metals, approximately 0.1 mg of iron and 0.05 mg of manganese/l of water are considered to be maximum values, since an overshoot of these limit values may already lead to a discoloration of the items to be washed and of the warewasher.

Similar considerations apply to the total salt content of the water to be introduced.

In order to observe limit values of this type, it is known to use reverse osmosis systems in commercial warewashers. Commercial warewashers of this type comprising conventional systems for observing water quality limit values of this type have the disadvantage in this case that they are maintenance- and energy-intensive and also produce a large amount of lost water, which can no longer be used for washing purposes. Conventional reverse osmosis facilities therefore require pumps with relatively high pressure and therefore with high delivery rate, such that the energy consumption rises significantly. In addition, the membrane filter systems of reverse osmosis facilities of this type are rapidly blocked, which increases the maintenance costs. In addition, the warewasher is not available for washing operation during the maintenance periods, that is to say in particular during the periods in which the membrane filter systems are replaced.

BRIEF SUMMARY OF THE INVENTION

The object of the present invention is to increase the throughput capacity of items and also the reliability of a warewasher of the type mentioned in the introduction. In particular, a warewasher and also a method for operating a warewasher are to be specified, by means of which the reliability of the warewasher is increased and the downtimes are reduced with a simultaneous reduction of costs and with a simultaneous decrease of the energy and water consumption, wherein the limit values mentioned above for the water quality are not exceeded.

A warewasher is accordingly proposed that has at least one treatment system comprising a jet system with at least one jet for spraying treatment liquid onto the items to be cleaned within at least one treatment zone, a fresh water system and a control device. In this case, the fresh water system has at least one water feed, at least one fresh water inlet for the introduction of fresh water into the at least one treatment zone, preferably into the at least one treatment system of the at least one treatment zone, as well as a controllable capacitive deionization unit connected on the input side to the at least one water feed and connected on the output side to the at least one fresh water inlet. The capacitive deionization unit has at least one cell, wherein the at least one cell of the capacitive deionization unit is designed to be operated in a deionization mode and in at least one further operating mode. The control device is designed to change the operating mode of the at least one cell of the capacitive deionization unit in accordance with at least one operating parameter of the warewasher.

A capacitive deionization unit of this type or the at least one cell thereof generally has a plate capacitor with a positive and a negative electrode, wherein "positive" and "negative" relate to the deionization mode of the capacitive deionization unit. Capacitive deionization units of this type are also referred to as FTC units (flow-through capacitor cells).

The positive and the negative electrode are held at a distance by a spacer and, in the gap therebetween, define a flow path for the water to be demineralized. During a demineralization process, that is to say when a positive electrical potential is applied to the positive electrode and a negative electrical potential is applied to the negative electrode, water (permeate) flowing between the capacitor plate is effectively demineralized.

In the region of the plates, minerals in the flowing water are retained accordingly (retentate). In order to free the capacitive deionization unit from the concentrated retentate after the completion of a demineralization phase, the polarization of the capacitor plates of the capacitive deionization unit is reversed, that is to say a negative electrical potential is applied to the capacitor plate positively poled in demineralization operation; accordingly, a positive electrical potential is applied to the capacitor plate negatively poled in demineralization operation. In order to prevent a reversed concentration of the minerals, that is to say concentration on the respective opposite capacitor plate, an anion membrane is provided on the side of the gap through which the water has flowed and is arranged on the positive electrode; accordingly, a cation membrane is provided on the negative electrode on the side of the gap.

As a result of the reverse polarization of the capacitor plates, the retentate produced during the demineralization phase is concentrated during this regeneration phase of the capacitive deionization unit in the (still or only slowly flowing) water in the gap between the capacitor plates. This concentrated retentate in the relatively small volume of water can then be rinsed out from the capacitive deionization unit in the form of wastewater.

Since, in accordance with the invention, at least one cell of the capacitive deionization unit is then to be operated in accordance with at least one operating parameter of the warewasher in different operating modes, maintenance times or downtimes of the warewasher can be avoided, and therefore continuous operation of the warewasher can be ensured to the greatest possible extent. Since it is additionally possible to dispense with maintenance- and energy-intensive processing systems, such as reverse osmosis systems, there is a considerable energy advantage. Since, in addition, only very small quantities of water are required to rinse off the retentate, the proportion of lost water is drastically reduced.

The object on which the invention is based is also achieved by a method for operating a warewasher, in particular a commercial warewasher for crockery or utensils, which is provided as a box-type warewasher or as a conveyor warewasher, wherein the warewasher has at least one treatment system comprising a jet system with at least one jet for spraying treatment liquid onto the items to be cleaned within the at least one treatment zone, and a fresh water system. The fresh water system has at least one water feed, at least one fresh water inlet for the introduction of fresh water into the at least one treatment zone, preferably into the at least one treatment system of the at least one treatment zone, as well as a controllable capacitive deionization unit connected on the input side to the at least one water feed and connected on the output side to the at least one fresh water inlet. The capacitive deionization unit has at least one cell, wherein the at least one cell of the capacitive deionization unit is designed to be operated in a deionization mode and in at least one further operating mode. In accordance with the invention, in the case of the method, the operating mode of the at least one cell of the capacitive deionization unit is changed in accordance with at least one operating parameter of the warewasher.

Advantageous developments of the warewasher according to the invention are specified in dependent claims 2 to 16 and advantageous developments of the method according to the invention are specified in dependent claims 18 to 21.

In this regard, the fresh water system therefore further has at least one buffer store and at least one fresh water pump between the capacitive deionization unit and the at least one fresh water inlet.

The provision of a separate buffer store results in yet further improved continuous operation of the warewasher. Since, due to the provision of the controllable capacitive deionization unit for water preparation, downtimes are largely avoided, a small buffer store in particular is sufficient.

In accordance with a further aspect of the invention, the at least one treatment system is provided as a recirculation system, wherein the warewasher furthermore has a washing tank for intercepting at least some of the sprayed treatment liquid and a washing pump for feeding treatment liquid collected in the washing tank to the at least one jet.

Due to a recirculation operation of all the liquid or of some of the liquid through the recirculation system, the quantity of prepared fresh water to be introduced can be reduced. Provided the entire quantity of water (and not just some of the quantity of water) is recirculated within the recirculation system, or also if a buffer store (optionally provided) has a sufficient fill level, temporal phases of the necessary regeneration and flush mode of the capacitive deionization unit can be even better decoupled from the course over time of the washing process. Due to the reduced maintenance times or downtimes, a greater throughput capacity of the warewasher is thus achieved.

In accordance with a further aspect of the invention, the capacitive deionization unit has at least two cells, wherein each of the cells is designed to be operated in a deionization mode and in at least one further operating mode. Due to the use of a multi-cell capacitive deionization unit of this type (multi-cell FTC), greater reliability of the warewasher according to the invention is achieved. In addition, peak loads, for example following extreme soiling of the items to be washed, can additionally be better endured.

It is conceivable to design the at least two cells to each be operated alternately in their respective deionization mode and their respective at least one further operating mode. Besides improved reliability, the specific advantage that each of the two cells can be operated in a demineralization mode whilst the other of the two cells is operated in a regeneration mode or flush mode is then also provided in this case. Further improved continuous operation is thus possible.

In accordance with a further aspect of the invention, the at least one further operating mode of the at least one cell of the capacitive deionization unit is a regeneration mode. Due to the corresponding control of the capacitive deionization unit in accordance with at least one operating parameter of the warewasher, it is thus possible to operate the capacitive deionization unit at a favorable moment in time during the program sequence in the regeneration mode, such that the at least one cell of the capacitive deionization unit is then available again for demineralization. In this regard, it is likewise conceivable for a further operating mode of the at least one cell of the capacitive deionization unit to be a flush mode. It is thus ensured that the at least one cell of the capacitive deionization unit is largely completely freed from concentrated retentate after its regeneration and is then available again for a demineralization phase.

In accordance with a further aspect of the invention, the at least one operating parameter is a washing program of the warewasher, in particular a glass washing program, a cutlery washing program or a pan washing program. In this case, if items, such as cutlery or glassware, that react relatively sensitively to specific types of ion concentrations in water are to be washed, it is taken into consideration in particular that the at least one cell of the capacitive deionization unit is operated in its deionization mode until the ion concentration falls below the limit values determined for the washing program associated with the respective items to be washed. With less sensitive items, for example in the case of pans to be washed during a pan washing program, the at least one cell of the capacitive deionization unit can then be operated over a shorter period in the deionization mode, which on the one hand saves energy and on the other hand provides a greater margin in terms of time for a possible subsequent regeneration and/or flush mode of the at least one cell of the capacitive deionization unit.

In accordance with a further aspect of the invention, the at least one operating parameter is an item detection, in particular a crockery type determination by means of an input identification device at the entry of a conveyor warewasher. A crockery type determination of this type then indicates for example to the control unit the type of items soon to be washed, for example glassware, cutlery or pans. Similarly to the advantages described above and provided for a washing program that constitutes the at least one operating mode of the warewasher, in this case too, that is to say in the case of an item detection, the individual operating modes of the at least one cell of the capacitive deionization unit can progress in a manner that is optimal in terms of time.

In accordance with a further aspect of the invention, the at least one operating parameter is a fill level in the at least one treatment zone and/or a fill level in the at least one buffer store. The fill level is preferably determined by means of a fill level sensor and is fed to the control device. Depending on the respective fill level and possibly in combination with another operating parameter, such as the washing program of the warewasher or an item detection, the progress over time of the individual operating modes of the at least one cell of the capacitive deionization unit can then be further optimized. For example, if a washing program requiring a relatively large amount of fresh water is to be executed, it is then thus conceivable for proportionately more deionized water to be produced under consideration of the current fill level within the treatment zone or the buffer store.

In accordance with a further aspect of the invention, the at least one operating parameter is a course over time of a washing program of the warewasher, in particular of a warewasher provided as a box-type warewasher. A course over time of a washing program may consist for example of a pre-washing phase, a washing phase, a draining phase, a rinsing phase and a possible subsequent standby phase.

It is thus possible to accordingly adapt the deionization mode and also the at least one further operating mode of the at least one cell of the capacitive deionization unit to the respective phase of the washing program.

In this regard, it is conceivable in particular for the at least one cell of the capacitive deionization unit to be operated in its deionization mode at least during the washing phase, and to be operated in the regeneration mode or in the flush mode at least during a further phase (for example pre-washing phase, draining phase, rinsing phase and/or standby phase). In this way, for example during machine phases in which only a small amount of fresh water or no fresh water is conveyed, said cell can be used to regenerate the capacitive deionization unit. During a machine standby phase, a regeneration process may take place for example, which provides improved temporal decoupling of the machine phases from the operating modes of the capacitive deionization unit.

Depending on whether a buffer store is provided, and if so in what capacity, the reverse variant is also conceivable however, that is to say the control unit is designed to operate the at least one cell of the capacitive deionization unit in a regeneration or flush mode at least during the washing phase and to operate the at least one cell of the capacitive deionization unit in its deionization mode at least during one of the further phases (that is to say pre-washing phase, draining phase, rinsing phase and/or standby phase). Due to the relatively long duration of the washing phase, it is easily possible to ensure complete regeneration of the capacitive deionization unit to the greatest extent possible. The full power of the capacitive deionization unit is thus then available again.

With regard to the course over time of the washing program, other combinations are also conceivable however. For example, the capacitive deionization unit can thus be operated in its deionization mode during a machine standby phase, and the regeneration or flushing may then take place during other phases.

In accordance with a further aspect of the invention, the at least one operating parameter is an ion concentration in the at least one treatment zone and/or an ion concentration in the at least one buffer store. In this case, the ion concentration is determined by means of a concentration sensor, preferably by means of a conductivity sensor, and is fed to the control device.

It is thus possible to obtain a defined ion concentration for the fresh water to be introduced and to adapt this for example to the selected washing program or the identified items. At the same time, optimum continuous operation of the warewasher is thus ensured, such that a regeneration or a flushing of the capacitive deionization unit can then take place for example if the ion concentration for example in a buffer tank is low enough and said buffer tank is sufficiently filled. An optimized course over time is thus provided once more, whereby the reliability and continuity of the warewasher are increased.

In this regard it is conceivable in particular for the control device to be designed to then select the deionization mode of the at least one cell of the capacitive deionization unit when the conductivity of the liquid in the at least one treatment zone and/or in the at least one buffer store exceeds an upper threshold value. In addition or alternatively, it is also conceivable for the control device to be designed to select the regeneration mode or flush mode of the at least one cell of the capacitive deionization unit when the conductivity of the liquid in the at least one treatment zone and/or in the at least one buffer store falls below a lower threshold value. In particular, it is conceivable for the upper threshold value and/or the lower threshold value to be fixed beforehand or to be fixable during the washing process. The upper threshold value and/or the lower threshold value is/are preferably fixed or can be fixed by the washing program or the item detection.

The upper threshold value is then particularly preferably approximately 80 µS/cm when a cutlery washing program is selected or when items are identified as cutlery by the item detection apparatus. Furthermore, the upper threshold value is then particularly preferably approximately 100 µS/cm when a glass washing program is selected or items are identified as glassware by the item detection device.

Optimal operation based on the quality of the fresh water to be introduced with a simultaneously optimized course over time of the operating modes of the capacitive deionization device is thus ensured. Continuous operation of the warewasher is ensured by the temporal decoupling, thus possible, of the course of operation of the warewasher from the modes of the capacitive deionization unit.

BRIEF DESCRIPTION OF THE SEVERAL VIEWS OF THE DRAWINGS

Exemplary embodiments of the solution according to the invention will be described in greater detail hereinafter with reference to the accompanying drawings, in which.

DETAILED DESCRIPTION OF THE INVENTION

Figure 1:
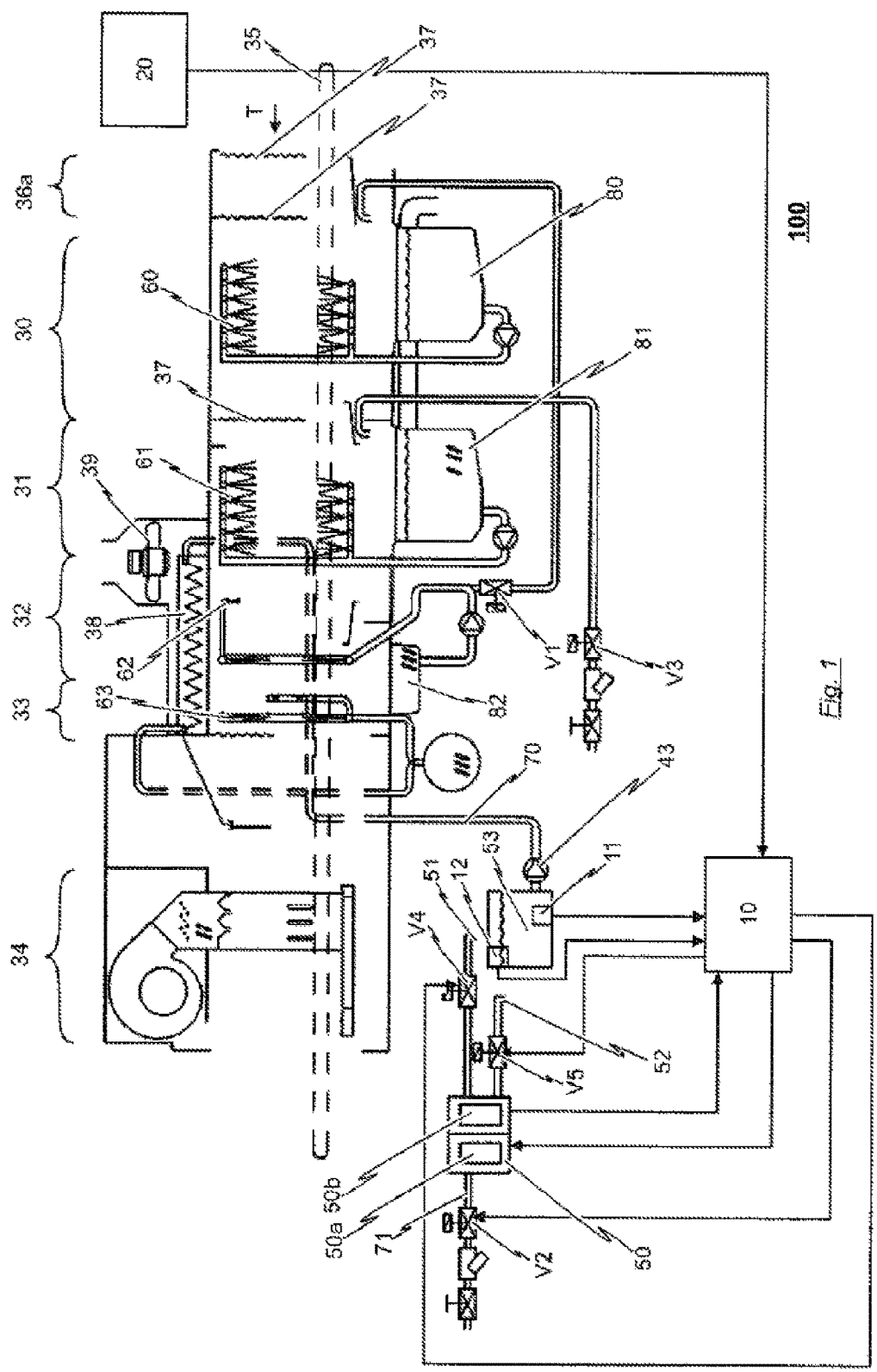
FIG. 1: shows a schematic warewasher provided in the manner of a conveyor warewasher in accordance with a first embodiment.

A schematic longitudinal view of an example of a conveyor warewasher 100 provided in accordance with the teaching of the present invention is shown in FIG. 1. The conveyor warewasher 100 according to the illustration in FIG. 1 has a pre-washing zone 30, a main washing zone 31, a post-washing zone 32, a final rinse zone 33 and also a drying zone 34. After passing through an entry tunnel 36*a*, the items to be washed (not illustrated in FIG. 1) then pass through the aforementioned zones in succession in the direction of transport T.

The items to be washed received either directly on a conveyor belt 35 or held by racks therefore run in the direction of transport T firstly through an entry tunnel 36*a*, the subsequent pre-washing zone 30, the subsequent main washing zone 31, the subsequent post-washing zone 32, the subsequent final rinse zone 33 and also the subsequent drying zone 34.

A treatment system with a jet system (60, 61, 62, 63) is assigned respectively to the treatment zones 30, 31, 32, 33 of the conveyor warewasher 100, wherein each jet system has at least one jet (e.g., from nozzle(s)) for spraying treatment liquid onto the items transported past. At least the pre-washing zone 30, the main washing zone 31 and also the post-washing zone 32 are assigned a respective washing tank (80, 81, 82), in which sprayed washing liquid is received and/or washing liquid for the jet systems of the respective treatment zones 30, 31, 32 is provided.

In order to recirculate the sprayed treatment liquid at least in the pre-washing zone 30, the main washing zone 31 and also the post-washing zone 32, respective pumps are provided, which, via a line system connected thereto, at least partially feed the liquid from the washing tank (80, 81, 82) again to the respective jet systems 60, 61, 62.

Furthermore, a warewasher control unit (not illustrated in the drawings) is provided and, in the embodiment of the invention provided as a conveyor warewasher 100, serves inter alia to control the respective washing pumps of the treatment systems in a suitable manner during a washing process in order to feed washing liquid at least temporarily via the respective line system to the jet systems 60, 61, 62 of the respective treatment systems.

In the case of the conveyor warewasher 100 illustrated in FIG. 1, the jet system 63 of the final rinse zone 33 is supplied with final rinse liquid via a fresh water inlet 70, through which fresh water is pumped from a buffer store 53 by means of a final rinse pump 43. The final rinse liquid is sprayed within the final rinse zone 33 via the jets of the jet system 63, which are arranged above and below the conveyor belt 35, onto the items to be washed (not illustrated in FIG. 1). As indicated in FIG. 1, the jet system 63 in the final rinse zone 33 may also have rinsing jets arranged laterally.

Some of the final rinse liquid sprayed in the final rinse zone is transported from zone to zone via a cascade system, against the direction of transport T of the items to be washed. The final rinse liquid sprayed in the final rinse zone 33 is intercepted in the tank (post-washing tank 82) in the post-washing zone 32, from which it is conveyed via the washing pump belonging to the washing system of the post-washing zone 32 to the jet system 62, that is to say to the post-washing jets 62 of the post-washing zone 32. In the post-washing zone 32, washing liquid is rinsed off from the items.

The liquid accumulating in this case flows into the main washing tank 81 of the main washing zone 31, is normally provided with a cleaning agent and is sprayed via the washing jets of the washing system belonging the main washing zone 31 with the aid of a washing pump belonging to the washing system 61 of the main washing zone 31 onto the items to be washed.

The washing liquid then flows from the washing tank 81 of the main washing zone 31 into the pre-washing tank 80 of the pre-washing zone 30. The washing liquid collected in the pre-washing tank 80 is sprayed in the pre-washing zone 30 via the pre-washing jets of the jet system 60 belonging to the pre-washing zone 30 with the aid of a washing pump belonging to the washing system 60 in the pre-washing zone 30 onto the items to be washed in order to remove large soiling particles from the items to be washed.

In the embodiment illustrated in FIG. 1, a fresh water system is provided that has a controllable capacitive deionization unit 50 arranged between a water feed 71 and the fresh water inlet 70, said deionization unit in turn having two cells 50a, 50b.

The capacitive deionization unit 50 is provided in this case in such a way that it (or its cells 50a, 50b) can be transferred in a controlled manner into a deionization mode, a regeneration mode and also a flush mode. These individual operating modes will be explained in greater detail further below in conjunction with FIGS. 3 to 5.

During the deionization operation of the capacitive deionization unit 50 (or of the cells 50a, 50b), deionized fresh water is transferred via a permeate outlet 51 of the capacitive deionization unit 50 into the buffer store 53. From here, it can be fed to the treatment zones, in particular to the jet system 63 of the final rinse zone 33, by means of the (likewise controllable) final rinse pump 43 via the fresh water inlet 70.

During a flush mode of the capacitive deionization unit 50, the concentrated retentate can be removed from the capacitive deionization unit 50 or the cells 50a, 50b thereof via a retentate outlet 52.

In the first embodiment shown in FIG. 1, a control device is additionally provided, which can be provided as a separate control device 10 or as a control device 10 integrated with the warewasher control unit.

The control device in the first embodiment shown in FIG. 1 is designed to change the operating mode of the cells 50a, 50b of the capacitive deionization unit 50 such that it is possible to switch over between the deionization mode of the capacitive deionization unit 50, the regeneration mode and also the flush mode. A switchover of this type of the operating mode of the capacitive deionization unit 50 is carried out in this case in accordance with at least one operating parameter.

As is shown in the first exemplary embodiment according to FIG. 1 on the basis of the conveyor warewasher 100, the control device 10 receives a conductivity signal concerning the conductivity of the liquid in the buffer store 53 via a conductivity sensor 11, a fill level within the buffer store 53 by means of a fill level sensor 12, and also information regarding identified items at the entry 35 of the conveyor warewasher 100 by means of an input identification device 20. In addition, it is conceivable for the control device 10 to receive information regarding the state, for example the retentate concentration, at the electrodes or the membranes of the cells 50a, 50b of the capacitive deionization unit 50.

The control device 10 switches over between the individual operating modes of the capacitive deionization unit 50 on the basis of one or more of these operating parameters, that is to say on the basis of information regarding the type of items identified by means of the input identification device 20, a conductivity and therefore an ion concentration in the buffer store 53, a fill level of the buffer store 53 and/or information regarding the retentate saturation status of the capacitive deionization unit 50.

In this case, it is conceivable in particular for the two cells 50a, 50b of the capacitive deionization unit 50 to each be operated selectively in their respective deionization mode, their respective regeneration mode and also their respective flush mode.

Of course, if the operating parameters change over time, a renewed switchover between the individual operating modes of the capacitive deionization unit 50 may occur at a later point.

With regard to the fill level within the buffer store 53 determined by means of the fill level sensor 12, in accordance with the first embodiment illustrated in FIG. 1, the capacitive deionization unit 50 or at least a cell 50a, 50b of the capacitive deionization unit 50 can then be operated in its deionization mode if the fill level within the buffer store 53 has fallen below a fixed or fixable threshold value.

In contrast thereto, if there is a sufficient fresh water fill level within the buffer store 53, that is to say if it is determined by means of the fill level sensor 12 that a fixed or fixable upper limit value for the fresh water fill level within the buffer store 53 is exceeded, the capacitive deionization unit 50 or at least one of the cells 50a, 50b of the capacitive deionization unit 50 is to be operated in its regeneration mode or in its flush mode.

It is thus possible to shift in time the regeneration phase or the flush phase, that is to say the phases during which no deionized fresh water is let out from the permeate outlet 51 into the buffer store 53, such that these (unproductive) operating periods of the capacitive deionization unit 50 are shifted into periods of time at which the buffer store 53 is sufficiently filled. Improved, more continuous operation of the conveyor warewasher 100 according to the first exemplary embodiment in FIG. 1 is thus in turn ensured without undesirable downtimes.

At the same time, since the cells 50a, 50b of the capacitive deionization unit 50 can be easily regenerated by means of control and prepared for the next temporal phase of deionization operation, the maintenance effort is reduced and reliability is also increased.

Similarly, alternatively or additionally to the fill level measurement, the conductivity may also be measured by means of the conductivity sensor 11 within the buffer store 53, and the measured value can be forwarded to the control device 10. A conductivity measurement of this type via a concentration sensor provided as a conductivity sensor 11 constitutes a measure for the ion concentration of the prepared fresh water within the buffer store 53. It is accordingly possible, by means of appropriate control of the capacitive deionization unit 50 or of the cells 50a, 50b to set a target ion concentration of the prepared fresh water, which is output into the buffer store 53. In particular in combination with an item type identification by means of the input identification device 20, such a desired ion concentration (max. ion concentration) of the prepared fresh water, which is output into the buffer store 53, can be easily achieved.

In this regard, it is conceivable for example if, when cutlery is identified by means of the input identification device 20 at the entry 35 of the conveyor warewasher 100, a maximum target ion concentration is automatically predefined, which corresponds to a conductivity of the prepared fresh water within the buffer store 53 of approximately 80 µS/cm.

If the items are identified as glassware, it is accordingly expedient to automatically predefine an ion concentration that corresponds to a measured conductivity of approximately 100 µS/cm, based on the prepared fresh water within the buffer store 53. It is of course possible for other item types to predefine other concentrations or conductivities related directly to the concentrations.

Since, in particular if the items are identified as glassware, a higher ion concentration can therefore be tolerated compared to items identified as cutlery for example, it is then possible for example for the control device 10 to continue to operate the capacitive deionization unit also over a period of time in which the quality of the prepared fresh water, which is let out via the permeate outlet 51 into the buffer store 53, has already deteriorated. A quality deterioration of this type is produced in particular in the case of saturation of the electrodes of the capacitive deionization unit 50 with retained materials (retentate). Since, in this case, the quality of the output fresh water determined via the conductivity sensor 11 is still sufficient for the identified item type (in this case: glassware), the regeneration phase and flush phase of the cells 50a, 50b of the capacitive deionization unit 50 is selected by the control device 10 at a later moment in time that is more favorable, for example when the buffer store 53 is sufficiently filled.

In addition, a controllable valve (V2, V4, V5) is provided respectively in the water feed 71, before the permeate outlet and also before the retentate outlet 52, wherein the valves V2, V4, V5 can likewise be controlled by means of the control device 10. These valves V2, V4, V5 serve to assist the switchover of the capacitive deionization unit 50 or cells 50a, 50b thereof between its/their respective deionization mode and the regeneration mode or flush mode.

Figure 2:
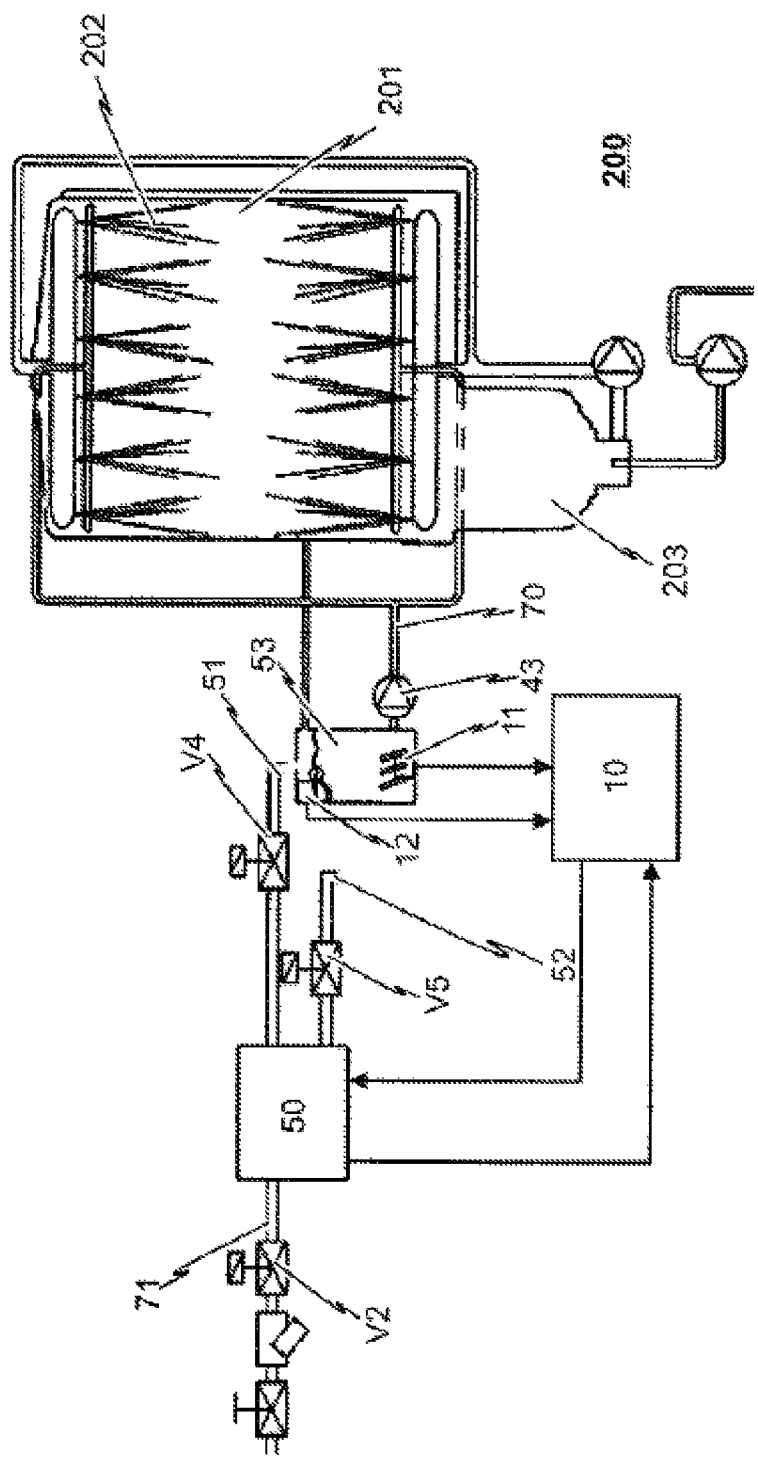
FIG. 2: shows a schematic view of a warewasher provided in the manner of a box-type warewasher in accordance with a second embodiment.

As illustrated in FIG. 2, it is also conceivable alternatively to the embodiment illustrated in FIG. 1 to provide the warewasher as a box-type warewasher 200. The box-type warewasher 200 has a single treatment zone 201 (treatment chamber), in which a jet system 202 consisting of upper and lower jets is provided to spray the items (not illustrated in FIG. 2) with treatment liquid.

In addition, a warewasher of this type provided as a box-type warewasher 200 has a program control device (not illustrated in FIG. 2) for controlling at least one washing program.

The treatment chamber (treatment zone 201) can be closed by a door (not shown) or a hood (not shown) and serves to receive items to be cleaned, such as crockery, cutlery, pots, pans and/or trays.

A washing tank 203 for receiving sprayed liquid from the treatment zone 201 is located beneath the treatment zone 201 of the box-type warewasher 200. A washing pump is provided to convey washing liquid from the washing tank through a washing liquid line system to the jet system 202 of the box-type warewasher 200. The washing liquid sprayed within the treatment zone 201 flows back into the washing tank 203 as a result of gravity. Here, the washing tank 203, the washing pump, the washing liquid line system and the jet system 202 together with the treatment zone 201 form a washing liquid circuit.

To feed fresh water into a fresh water inlet 70, which in turn introduces water into the jet system 202 or into the treatment zone 201 of the box-type warewasher 200, a fresh water pump 43 is provided, which is connected on the intake side to a buffer store 53. Similarly to the first embodiment described in conjunction with FIG. 1, a warewasher provided as a box-type warewasher 200 in accordance with the embodiment illustrated in FIG. 2 again has a fresh water system, which is formed inter alia by a capacitive deionization unit, which is connected on the input side to a water feed 71 and is connected on the output side to the fresh water inlet 70 with interpositioning of the buffer store 53 and the fresh water pump 43.

Again, a capacitive deionization unit 50 that has a plurality of cells 50a, 50b can also be used with a box-type warewasher 200. In this case too, a control device 10 is provided, which is designed to control the capacitive deionization unit 50 or cells 50a, 50b thereof in accordance with an operating parameter of the warewasher, in particular to select between a deionization mode, a regeneration mode and also a flush mode of the capacitive deionization unit 50 or of the cells, 50a, 50b.

In the case of the warewasher according to the second embodiment illustrated in FIG. 2 and provided as a box-type warewasher 200, a washing program of the warewasher in particular, such as a glass washing program, a cutlery washing program or a pan washing program, may be one of the operating parameters on which a switchover of the operating mode of the capacitive deionization unit by means of the control device is made dependent.

In particular if a conductivity sensor 11 for example is again additionally provided, which provides indications of the ion concentration within the buffer store via a measurement of the conductivity, it is then advantageous to match the individual operating modes of the capacitive deionization unit 50 to the requirements of the selective washing program. If a cutlery or a glass washing program is selected, the demineralization program step (that is to say the period of time) during which the capacitive deionization unit 50 or at least one of the cells 50a, 50b thereof is operated in the deionization mode can thus be extended in order to thus achieve a lower ion concentration of the output permeate.

If a cutlery program is selected, an upper limit value for the conductivity of the prepared fresh water within the buffer store 53, which provides indications of the ion concentration, can therefore be selected as approximately 80 µS/cm. If, on the other hand, a glass washing program is selected, this upper limit value may be approximately 100 µS/cm.

In addition, again similarly to the first embodiment described in conjunction with FIG. 1, a fill level sensor can be used on the buffer store 53 and presents an alternative or an additional operating parameter of the warewasher, in accordance with which the control device accordingly controls the operating modes of the capacitive deionization unit 50 or cells 50a, 50b thereof.

In other words, the necessary fresh water quantities and the selected washing program determine the time limits and also the delivered permeate quality of the capacitive deionization unit (FTC unit) by influencing the start or end times or the duration of the individual operating modes of the capacitive deionization unit (deionization/regeneration/flushing).

These operating modes of the capacitive deionization unit 50 will be explained in greater detail hereinafter with reference to the illustrations in FIGS. 3 to 5.

Figure 3:
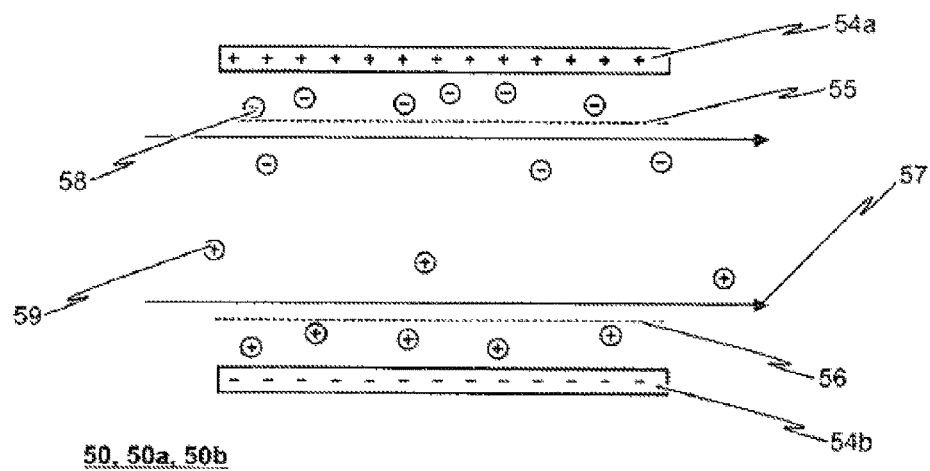
FIG. 3: shows a schematic cross-sectional view of a cell of a capacitive deionization unit for use in a warewasher in accordance with the embodiments during a deionization procedure.

FIG. 3 shows a schematic sectional view of a cell 50a, 50b of a capacitive deionization unit 50, which has a positive electrode 54a and a negative electrode 54b. It is noted in this regard that the expressions "positive" and "negative" specify the polarity of these electrodes 54a, 54b during deionization operation. As will be described further below, the polarity of the electrodes 54a, 54b is also reversed in other operating modes.

Between the positive electrode 54a and the negative electrode 54b, a flow path for flowing water is provided, of which the direction of flow is indicated by reference sign 57. In the vicinity of the positive electrode 54a, an anion membrane 55 is provided towards the flow path; similarly, a cation membrane 56 is provided in the vicinity of the negative electrode 54b. The anion membrane 55 is only permeable to anions, whereas the cation membrane 56 can similarly only be passed by cations.

In the deionization operation illustrated in FIG. 3, a positive voltage is therefore applied to the positive electrode 54a and a negative voltage is applied to the negative electrode 54b. Water flowing through the cell 50a, 50b is then deionized in a deionization operation, as is illustrated in FIG. 3, since the anions 58 within the water flow are drawn in the direction of the positive electrode 54a and the cations 59 are drawn in the direction of the negative electrode 54b. Water leaving the cell therefore still has just a very low ion concentration.

Figure 4:
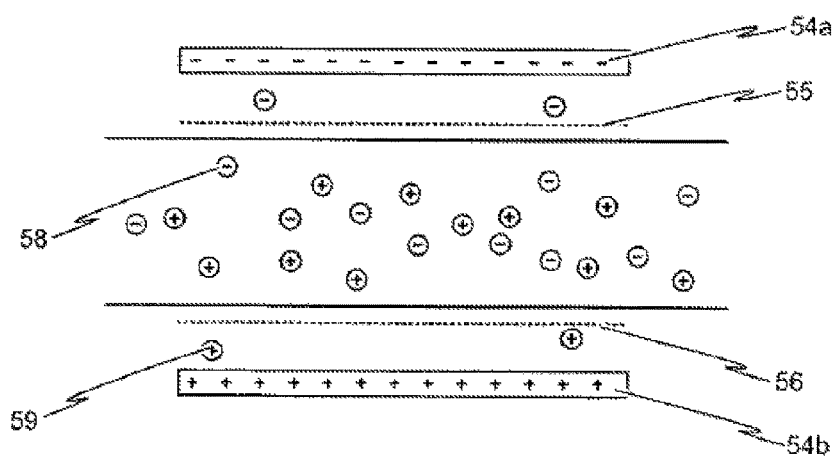
FIG. 4: shows the cell of the capacitive deionization unit from FIG. 3 during a regeneration procedure.

A regeneration mode of the cell 50a, 50b from FIG. 3 is shown in FIG. 4. As is illustrated in FIG. 4, a negative electrical voltage is applied to the positive electrode 54a during regeneration operation; similarly, a positive voltage is applied to the negative electrode 54b during this regeneration operation.

During the regeneration operation, the water within the cell is normally at a standstill, and therefore the mineral ions collected at the electrodes during the deionization operation of the cell 50a, 50b become concentrated in the water. In this case, it should be noted that the anion membrane 55 and the cation membrane 56 ensure that there is no enrichment of the oppositely charged ions 55, 59 at the electrodes 54a, 54b.

During a flush procedure illustrated in FIG. 5, no electrical voltage is applied subsequently to the positive electrode 54a or the negative electrode 54b. The retentate in the water concentrated within the cell can then be flushed out from the cell 50a, 50b in the direction of flow 57.

Figures 5, 6, 7, 8:
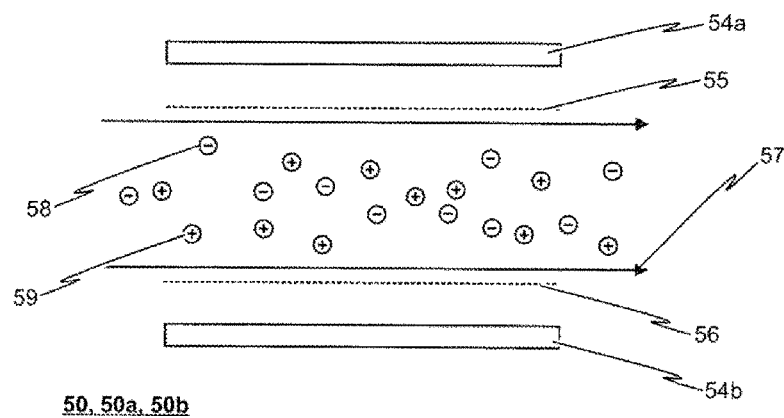
FIG. 5: shows the cell of the capacitive deionization unit according to FIG. 3 during a flush procedure.
FIG. 6: shows a table presenting a program sequence of a warewasher provided as a box-type warewasher in accordance with the second embodiment with a first possible assignment of operating modes of the capacitive deionization unit to the individual program steps.
FIG. 7: shows a table presenting a program sequence similarly to FIG. 6 in accordance with a second assignment option.
FIG. 8: shows a table presenting a program sequence similarly to FIGS. 6 and 7 in accordance with a third possible assignment.

Tables presenting different assignments of the different operating modes of the capacitive deionization unit 50 or the cells 50a, 50b thereof to different points of a washing program of a warewasher provided as a box-type warewasher 200 are shown in FIGS. 6 to 8.

In accordance with the program sequence in FIG. 6, the capacitive deionization unit 50 is operated in the deionization mode during a pre-washing phase and during a washing phase of a washing program. During a draining procedure, the capacitive deionization unit 50 is then operated in a regeneration mode. During a final rinse procedure, a flush mode of the capacitive deionization unit is implemented. It is thus ensured that the water preparation and the inlet of the prepared fresh water into a buffer store 53 occur at points of the washing program of the box-type warewasher 200, during which predominantly a recirculation operation takes place within the treatment zone 201 of the box-type warewasher 200, that is to say when relatively little prepared fresh water has to be fed into the treatment zone 201.

Alternatively thereto however, the course illustrated in FIG. 7 may also be used, in accordance with which a standby phase, that is to say a non-operational phase, of the box-type warewasher 200 is used to prepare the water, such that fresh water is available at any time for a washing program to be newly started.

In accordance with the course from FIG. 8, it can be seen however that fresh water preparation by means of deionization can also take place during the washing phase and the draining phase of the washing program, whereas the regeneration takes place during the rinsing phase, and the flush procedure of the capacitive deionization unit 50 takes place during a pre-washing phase.

It is noted at this juncture that all of the above-described parts considered in isolation and any combination, in particular the details illustrated in the drawings, are claimed as being essential to the invention. A person skilled in the art will be familiar with modifications thereto.

LIST OF REFERENCE SIGNS 10 control device
11 conductivity sensor
12 fill level sensor
20 input identification device
30 pre-washing zone
31 main washing zone
32 post-washing zone
33 final rinse zone
34 drying zone
35 transport apparatus
36 entry
36a entry tunnel
37 separation curtain
38 heat recovery device
39 fan
40 main line system
41 hot water preparer
42 bypass line
43 final rinse pump, fresh water pump
50 capacitive deionization unit
50a first cell of the capacitive deionization unit
50b second cell of the capacitive deionization unit
51 permeate outlet
52 retentate outlet
53 buffer store
54a positive electrode
54b negative electrode
55 anion membrane
56 cation membrane
57 direction of flow
58 anion
59 cation 60 pre-washing jets
61 main washing jets
62 post-washing jets
63 final rinsing jets
70 fresh water inlet
71 water feed
80 pre-washing tank
81 main washing tank
82 post-washing tank
100 conveyor warewasher
200 box-type warewasher
201 treatment zone of the box-type warewasher
202 jet system of the box-type warewasher
203 washing tank of the box-type warewasher
T direction of transport

The invention claimed is:

1. A warewasher having at least one treatment system comprising a jet system with at least one jet for spraying treatment liquid onto items to be cleaned within at least one treatment zone, a fresh water system and a control device, wherein the fresh water system has at least one water feed, at least one fresh water inlet for the introduction of fresh water into the at least one treatment system of the at least one treatment zone as well as a controllable capacitive deionization unit having at least one cell and connected on an input side to the at least one water feed and connected on an output side to a permeate outlet and a retentate outlet, wherein the permeate outlet feeds the at least one fresh water inlet and wherein the retentate outlet does not feed the fresh water inlet, wherein the at least one cell of the capacitive deionization unit is designed to be operated in any one of a plurality of operating modes including a deionization mode, in which a positive voltage is applied to a positive electrode of the at least one cell and a negative voltage is applied to a negative electrode of the at least one cell, and at least one further operating mode, wherein the control device is designed to change between operating modes of the at least one cell of the capacitive deionization unit in accordance with at least one operating parameter of the warewasher, wherein the at least one further operating mode of the at least one cell of the capacitive deionization unit is a regeneration mode, in which a negative voltage is applied to the positive electrode of the at least one cell and a positive voltage is applied to the negative electrode of the at least one cell, or a flush mode, in which no voltage is applied to the positive electrode or the negative electrode and water flows through the at least one cell to the retentate outlet and not to the permeate outlet, wherein the at least one operating parameter is an ion concentration of liquid in the at least one treatment zone, and wherein the ion concentration is detected by a concentration sensor of the warewash machine and the detected ion concentration is fed to the control device, wherein a washing program of the warewasher sets limit values for ion concentration of liquid in the at least one treatment zone, and wherein the control device is designed to select the deionization mode of the at least one cell of the capacitive deionization unit in response to the control device determining that the detected ion concentration of liquid in the at least one treatment zone exceeds an upper non-zero threshold limit value, and wherein the control device is designed to select the regeneration mode or the flush mode of the at least one cell of the capacitive deionization unit in response to the control device determining that the detected ion concentration of liquid in the at least one treatment zone falls below a lower non-zero threshold limit value.

2. The warewasher according to claim 1, wherein the fresh water system further has at least one buffer store and at least one fresh water pump between the capacitive deionization unit and the at least one fresh water inlet.

3. The warewasher according to claim 1, wherein the at least one treatment system is provided as a recirculation system, and wherein the warewasher furthermore has a washing tank for intercepting the sprayed treatment liquid and a washing pump for feeding treatment liquid collected in the washing tank to the at least one jet.

4. The warewasher according to claim 1, wherein the capacitive deionization unit has at least two cells, and wherein each of the cells is designed to be operated in the deionization mode and in the at least one further operating mode.

5. The warewasher according to claim 4, wherein the at least two cells are designed to each be operated alternately in their respective deionization mode and their respective at least one further operating mode.

6. The warewasher according to claim 1, wherein the at least one operating parameter further includes a crockery type determination by means of an input identification device at the entry of the warewasher, which is formed as a conveyor warewasher.

7. The warewasher according to claim 2, wherein the at least one operating parameter further includes a fill level in the at least one treatment zone and/or in the at least one buffer store, and wherein the fill level is determined by means of a fill level sensor and is fed to the control device.

8. The warewasher according to claim 1, wherein the at least one operating parameter further includes a course of the washing program of the warewasher.

9. The warewasher according to claim 8, wherein the course of the washing program has a washing phase and at least one further phase comprising a pre-washing phase, a draining phase, a rinsing phase and/or a standby phase, and wherein the control device is designed to select the deionization mode of the at least one cell of the capacitive deionization unit during the washing phase and to select the regeneration mode or the flush mode during the at least one further phase.

10. The warewasher according to claim 8, wherein the course of the washing program has a washing phase and at least one further phase comprising a pre-washing phase, a draining phase, a rinsing phase, and/or a standby phase, and wherein the control device is designed to select the regeneration mode or the flush mode of the at least one cell of the capacitive deionization unit during the washing phase and to select the deionization mode during the at least one further phase.

11. The warewasher according to claim 1, wherein the upper threshold value is 80 μS/cm for a cutlery washing program or items identified as cutlery and is 100 μS/cm for a glass washing program or items identified as glassware.

* * * * *